(12) United States Patent
Kosiorek et al.

(10) Patent No.: US 10,047,710 B2
(45) Date of Patent: Aug. 14, 2018

(54) METHOD FOR REFURBISHING A VALVE SEAT IN A FUEL INJECTOR ASSEMBLY

(75) Inventors: Roman F. Kosiorek, Greenville, MI (US); Terrance G. Cunningham, Cedar Springs, MI (US)

(73) Assignee: DETROIT DIESEL CORPORATION, Detroit, MI (US)

( * ) Notice: Subject to any disclaimer, the term of this patent is extended or adjusted under 35 U.S.C. 154(b) by 2148 days.

(21) Appl. No.: 11/936,535

(22) Filed: Nov. 7, 2007

(65) Prior Publication Data

US 2009/0113707 A1    May 7, 2009

(51) Int. Cl.
*F02M 57/02* (2006.01)
*B23P 6/00* (2006.01)
*F02M 61/16* (2006.01)
*F02M 63/00* (2006.01)

(52) U.S. Cl.
CPC ............. *F02M 57/023* (2013.01); *B23P 6/00* (2013.01); *F02M 61/168* (2013.01); *F02M 63/0015* (2013.01); *F02M 2200/04* (2013.01); *F02M 2200/8069* (2013.01); *Y10T 29/49302* (2015.01)

(58) Field of Classification Search
USPC ............. 29/888.01, 888.011, 402.01–402.04, 29/888.021
See application file for complete search history.

(56) References Cited

U.S. PATENT DOCUMENTS

| | | |
|---|---|---|
| 2,968,925 A | 1/1961 | Blevens |
| 3,521,412 A | 7/1970 | McCarty |
| 3,823,514 A | 7/1974 | Tsuchiya et al. |
| 3,886,697 A | 6/1975 | Feldcamp et al. |
| 3,909,217 A | 9/1975 | Perry |
| 4,087,943 A | 5/1978 | Perry |
| 4,227,292 A * | 10/1980 | Kipling ............ 29/402.04 |
| 4,359,022 A | 11/1982 | Nakamura et al. |
| 4,688,527 A | 8/1987 | Mott et al. |
| 4,832,637 A | 5/1989 | Goluba |
| 4,936,057 A | 6/1990 | Rhoades |
| 5,054,247 A | 10/1991 | Rhoades et al. |
| 5,148,780 A * | 9/1992 | Urano et al. ............ 123/193.2 |
| 5,295,300 A * | 3/1994 | Garrick, Jr. ............ 29/888.021 |
| 5,503,123 A | 4/1996 | Carter et al. |
| 5,511,518 A | 4/1996 | Jain et al. |
| 5,799,683 A | 9/1998 | Hamada et al. |
| 5,807,163 A | 9/1998 | Perry |
| 5,855,633 A | 1/1999 | Simandl et al. |
| 5,960,760 A * | 10/1999 | Wang et al. ............ 123/188.3 |
| 6,132,482 A | 10/2000 | Perry |

(Continued)

OTHER PUBLICATIONS

New International Webster's concise Dictionary of the English Language; International Encyclopedia Edition 1997; 4 pages.

(Continued)

*Primary Examiner* — Moshe Wilensky
(74) *Attorney, Agent, or Firm* — Bill C. Panagos; Daniel J. Checkowsky; Panagos Law Group PLLC

(57) ABSTRACT

A method of refurbishing a fuel injector body valve seat. The method includes removing a poppet valve from the valve bore guide, machining the bore and valve seat to remove cavitation, machining to create an undercut a the stress riser, nitriding the valve bore guide and radiusing fuel passage to a sufficient depth to restore hardness thereto.

2 Claims, 3 Drawing Sheets

(56) References Cited

U.S. PATENT DOCUMENTS

| | | | |
|---|---|---|---|
| 6,135,132 A | 10/2000 | Welker et al. | |
| 6,273,787 B1 | 8/2001 | Gilmore et al. | |
| 6,306,011 B1 | 10/2001 | Perry et al. | |
| 6,339,877 B1* | 1/2002 | Straub et al. | 29/888.42 |
| 6,354,001 B1* | 3/2002 | Asanuma | 29/888.451 |
| 6,374,808 B1 | 4/2002 | Fulford et al. | |
| 6,439,675 B1 | 8/2002 | Zechmann et al. | |
| 8,046,917 B2 | 11/2011 | Kosiorek | |
| 8,602,843 B2 | 12/2013 | Lunn et al. | |
| 2003/0131473 A1* | 7/2003 | Trudeau et al. | 29/888.44 |
| 2005/0161014 A1* | 7/2005 | Komai et al. | 123/193.2 |
| 2006/0080832 A1* | 4/2006 | Yip et al. | 29/888.021 |
| 2006/0106569 A1* | 5/2006 | Kosiorek et al. | 702/166 |
| 2007/0138422 A1* | 6/2007 | Najmolhoda et al. | 251/129.14 |
| 2007/0215099 A1* | 9/2007 | Cavanagh et al. | 123/305 |
| 2008/0104836 A1* | 5/2008 | Gratton | 29/888.011 |

OTHER PUBLICATIONS

Webster's New Twentieth Century Dictionary Unabridged 1992-1993; 2d ed. 1962; 5 pages.
Machinery Component Maintenance and Repair; Heinz P Bloch & Fred K. Geitner; Elsevier Inc. 2005; 3 pages.

* cited by examiner

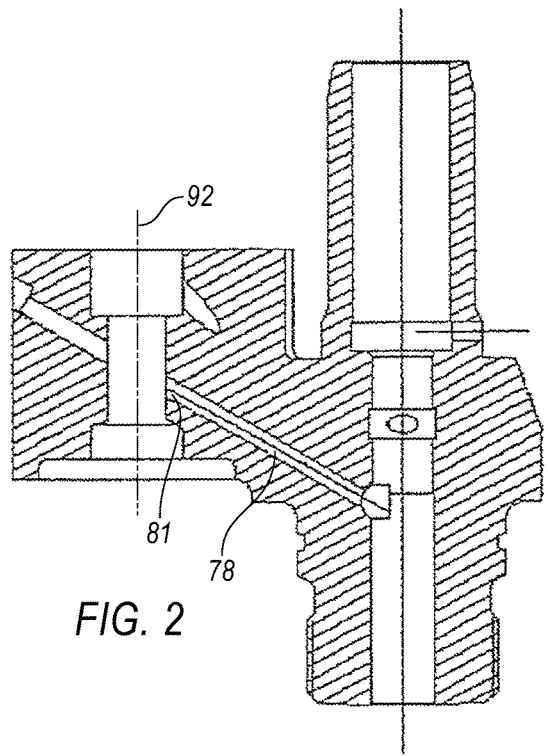
FIG. 2
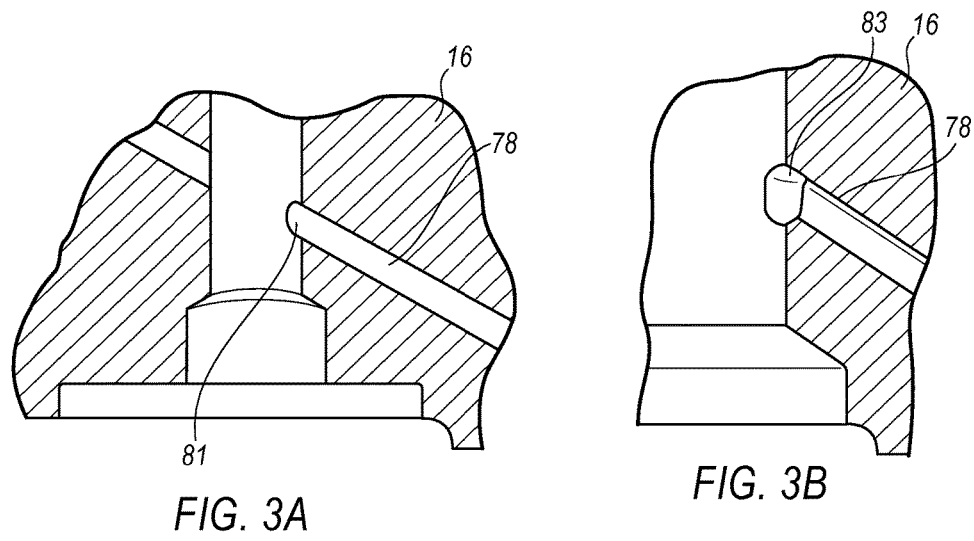
FIG. 3A
FIG. 3B

METHOD FOR REFURBISHING A VALVE SEAT IN A FUEL INJECTOR ASSEMBLY

BACKGROUND OF THE INVENTION

1. Field of the Invention

The present invention relates, generally, to a method for refurbishing a valve seat. More specifically, the present invention relates to a method for refurbishing the valve seat associated with a valve bore extending through a fuel injector body.

2. Background Art

Fuel injector assemblies are employed in internal combustion engines for delivering a predetermined, metered mixture of fuel and air to the combustion chamber at preselected intervals. In the case of compression ignition, or diesel engines, the fuel/air mixture is delivered at relatively high pressures. Presently, conventional injectors deliver this mixture at pressures as high as 32,000 psi. These are fairly high pressures and have required considerable engineering attention to ensure the structural integrity of the injector, good sealing properties, and the effective atomization of the fuel within the combustion chamber. However, increasing demands on greater fuel economy, cleaner burning, fewer emissions and $NO_x$ control have placed, and will continue to place, even higher demands on the engine's fuel delivery system, including increasing the fuel pressure within the injector. Fuel injectors presently employed in the related art typically include a high pressure fuel passage, which extends between a solenoid actuated control valve and the plunger cylinder in the injector body. Fuel at relatively low pressure is supplied to the control valve which then meters the delivery of the fuel at very high pressures and at predetermined intervals through the high pressure fuel passage to the plunger cylinder. The fuel ultimately exits the injector through a fuel nozzle.

The solenoid actuated control valve (poppet valve) is supported in a stepped bore which typically extends through a side body of the injector. The stepped bore defines a supply chamber and a valve bore, which receives a valve stem of the associated control valve. The valve bore terminates in a chamfered valve seat which is formed so as to define an angle relative to the centerline of the valve bore. Similarly, the valve stem terminates in a head which seats against the valve seat under the force generated by the solenoid. The head is configured to mate closely with the valve seat.

At least a portion of the valve stem is subject to the high pressure generated in a valve opening direction during an injection cycle. Accordingly, the solenoid must generate sufficient force in the valve closing direction to overcome such pressure. These forces are borne by the valve seat through the head of the control valve. Fuel injectors and their associated sub-components must endure millions of injection cycles during a standard useful life of the injector. While individual components may wear out, the injector body, per se, having no moving parts, is capable of reuse. The injector body is an expensive part of the injector assembly. It includes many precisely machined ports, passageways, slots, and other surfaces. However, one barrier to the reuse of the injector body has been refurbishing the solenoid valve seat. The valve seat typically endures significant punishment over the useful life of the injector and must be machined to bring it back within specification. The concentricity of the valve seat about the centerline of the valve bore is an important parameter that must be precisely controlled during any refurbishing process. In the past, there has been a lack of methods that may be employed to quickly, effectively and efficiently refurbish the solenoid valve seat on a production basis. This fact has contributed to the tendency to scrap the injector body after the less durable sub-components have been spent.

Thus, there is a need in the art for a method which may be employed to refurbish or recondition the poppet valve seat on a production basis and thereby extend the useful life of the injector body.

BRIEF SUMMARY OF THE INVENTION

The present invention is directed to a method for refurbishing a fuel injector body having a solenoid controller poppet valve located in a valve bore guide in the body. The valve is adjusted to cooperatively engage a valve seat surface in the body. A fuel passage intersects the bore at an angle that forms a control stress riser. The method includes removing the poppet valve from the guide bore, machining the bore and valve seat to remove cavitation, machining to create an undercut radiused intersection of the fuel passage and bore, radiusing the intersection of the fuel passage an bore with abrasive flow machining to create a controlled radius, nitriding the machined bore and fuel passage radius to restore hardness to the machined areas, and inserting a sleeve into the machined bore to act as a valve seat.

The nitriding occurs at a sufficient depth to restore like new hardness to the machined bore and the radiused intersection of the fuel passage.

BRIEF DESCRIPTION OF THE DRAWINGS

FIG. 2 is a detailed view of the injector of FIG. 1 showing the machine bored valve guide bore;

FIG. 3A is a view of the intersection of the machined bore and fuel passage;

FIG. 3B is a view of the intersection of the machined bore and fuel passage after undercutting and radiusing;

DETAILED DESCRIPTION OF THE PREFERRED EMBODIMENT(S)

Figure 1:
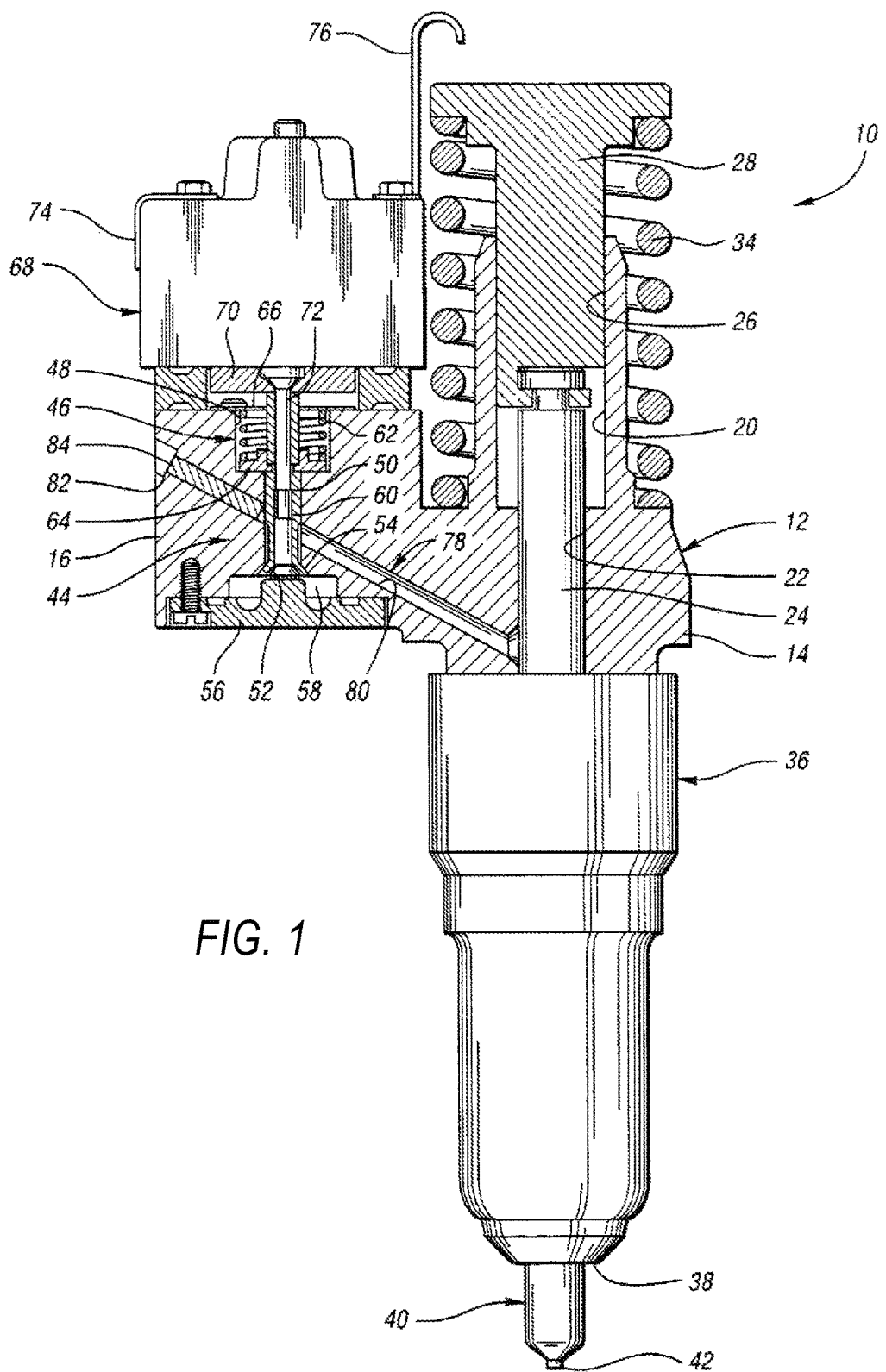
FIG. 1 is a representation of a fuel injector.

The present invention relates to the improved refurbishing of fuel injectors, such as disclosed in U.S. Pat. No. 6,339,877, incorporated herein by reference. Specifically, referring to FIG. 1, there is generally shown an electromagnetic fuel injector of the type commonly employed in the related art. More specifically, a fuel injector pump assembly 10 is shown in FIG. 1 having an electromagnetically-actuated, pressure-balanced control valve incorporated therein to control fuel discharge from the injector portion of this assembly 10 in a manner to be described. As illustrated in this figure, the electromagnetic fuel injector assembly 10 includes an injector body 12, which has a vertical main body portion 14 and a side body portion 16. The main body portion 14 includes a stepped, cylindrical bore 20 therethrough. The stepped, cylindrical bore 20 includes a cylindrical lower wall 22, which slidably receives a pump plunger 24. In addition, the stepped, cylindrical bore 20 includes an upper wall 26 of larger internal diameter to slidably receive a plunger actuator follower 28. The plunger actuator follower 28 extends out one end of the main body 14 whereby it and the pump plunger 24 connected thereto are adapted to be reciprocated by an engine driven cam or rocker as conventionally known in the art. A stop pin (not shown) extends through an upper portion of the main injector body portion 14 into an axial groove in the plunger actuator follower 28 to limit upward travel of the follower induced under the bias of a plunger return spring 34. A nut, generally indicated at 36, is threaded to the lower end of the main body portion 14 and forms an extension thereof. The nut 36 has an opening 38 at its lower end through which extends the lower end of a combined injector valve body or nozzle assembly, generally indicated at 40. The nozzle assembly 40 includes a spray tip 42. The nozzle assembly 40 may include a number of elements that are all well known in the art and that form no part of the present invention. Accordingly, the inner workings of the nozzle assembly 40 will not be described in detail here.

The delivery of fuel from a source such as a fuel tank to the nozzle assembly 40 is controlled by means of a solenoid-actuated, pressure-balanced valve, generally indicated at 44 in the side body portion 16. The side body portion 16 is provided with a stepped vertical valve bore, generally indicated at 46, which defines a supply chamber 48 and an intermediate or valve stem guide portion 50. The guide portion 50 of the valve bore 46 terminates in a valve seat 52. The valve seat 52 is chamfered so as to define an angle relative to the centerline of the valve bore 46. The valve 44 is received within the stepped vertical valve bore 46 and includes a valve stem 60 terminating in a head 54 which seats against the valve seat 52. The stem 60 extends upward from the head 54. A closure cap 56 is mounted to the underside of the side body portion 16 and in connection therewith forms a spill chamber 58. The valve 44 is normally biased in a valve opening direction, downward with reference to FIG. 1, by means of a coil spring 62, which loosely encircles valve stem 60. On end of the spring 62 abuts against a washer-like spring retainer 64 encircling the valve stem 60. The other end of the spring 62 abuts against the lower face of a spring retainer 66. Movement of the valve 44 in the valve closing direction, upward with reference to FIG. 1, is effected by means of a solenoid assembly, generally indicated at 68. The solenoid assembly 68 includes an armature 70 having a stem 72 depending centrally from its head. The armature 70 is secured to the valve 44. As commonly known in the art, the solenoid assembly 68 may further include a stator assembly having an inverted cup shaped solenoid case 74. A coil bobbin supporting a wound solenoid coil and a segmented multi-piece pole piece are typically supported within the solenoid case 74. The solenoid coil is connected through electrical connectors 76 to a suitable source of electrical power via a fuel injection electronic control circuit (not shown). Thus, the solenoid coil can be energized as a function of the operating conditions of an engine.

A high pressure fuel passage, generally indicated at 78, provides fluid communication between the control valve 44 and the fuel nozzle assembly 40. As shown in FIG. 1, the fuel passage 78 is formed by drilling a hole from one side of the side body portion 16 of the injector body 12 and between control valve 44 and the stepped cylindrical bore 20. In this way, the fuel passage 78 defines a delivery portion 80 extending between the control valve 44 and the stepped cylindrical bore 20 and a stub portion 82 extending between the valve stem guide portion 50 in the control valve 44 and the side body portion 16. A plug 84 seals the open end of the stub portion 82 of the high pressure fuel passage 78. As mentioned above, fuel injectors and their associated sub-components must endure millions of injection cycles during a standard useful life of the injector. The valve seat 52 typically endures significant punishment over the useful life of the injector as the valve 44 moves between its open and closed positions thus repeatedly forcing the head 54 of the valve 44 against the valve seat 52 when the valve 44 is in its closed position. Typically, if the life of the injector body 12 is to be extended, the valve seat 52 must be refurbished.

The fuel injector body is subjected to extreme pressures and wear due to increasing emissions standards that require increased injection pressures increased injection pressure also leads to higher spill (injection pressure unloading) velocities at the poppet valve seat surface. These higher velocities lead to increased fuel erosion and tendency for cavitation. The depth of the cavitation can exceed maximum allowable machining limits for rework and are considered scrap. A method to machine out the entire valve bore guide and poppet valve seat surface is a desirable end addressed by the present invention.

Referring to FIG. 2, there is illustrated therein an injector body as described in reference to FIG. 1, with the poppet valve removed showing the valve guide bore having a longitudinal axis parallel to the axis of the fuel injector position, and intersecting the fuel passage 78 at a critical high pressure fuel stress riser 81. Specifically, the injector body is machined to remove the old poppet valve guide and seat surface as shown in FIG. 1. The valve guide bore and the stress riser are subjected to machining such as having or boring to remove any wear or cavitation. This leaves a sharp intersection between the high pressure passage and the new machined bore, thereby creating an unacceptable stress riser. The high pressure plug passage may be left unplugged as the new insert will seal the passage off through the press interference of the sleeve.

FIG. 3A is a detailed view of the machined valve guide bore and the intersection with the fuel passage 78 showing the critical stress riser 81 formed by the intersection of the machined valve guide bore and the fuel passage. Due to the extremely high pressures encountered in fuel injectors, premature failures will occur at the critical stress riser unless it is radiused to a controlled radius 82, as seen in FIG. 3B.

In order to accomplish this reduction of the critical stress riser, the intersection of the fuel passage and the poppet valve guide bore is first undercut. The entire assembly is then subjected to abrasive flow machining (AFM) to remove any machining imperfections and create a controlled radius of from about 0.7 mm to about 1.0 mm.

The body is then worked and the machined poppet valve guide bore and radiused critical riser are then subjected to re-nitriding to re-establish case depth and hardness at a poppet valve guide bore diameter, the high pressure intersection radius and penetrate into the high pressure passage to add strength to the body.

Figure 4:
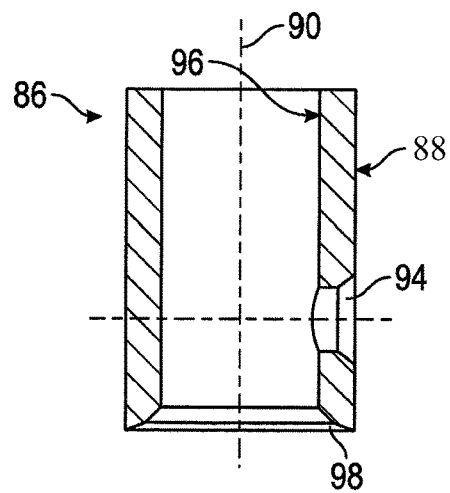
FIG. 4 is a schematic view of the replacement sleeve guide seat.

A sleeve 86, as seen in FIG. 4 having an outer diameter 88 that permits it to be pressed into the machined bore is used as a replacement sleeve valve guide seat. The sleeve is generally cylindrical, about a longitudinal axis 90 coincident with the longitudinal axis 92 of the poppet valve guide bore. The sleeve is equipped with a radiused aperture 94 that communicates with the fuel passage 78. The sleeve has an inner diameter 96 that may be the same as the diameter of the unmachined poppet valve bore, and the sleeve is of sufficient height and equipped with a valve seat 98 to the poppet valve at one end thereof.

Figure 5A:
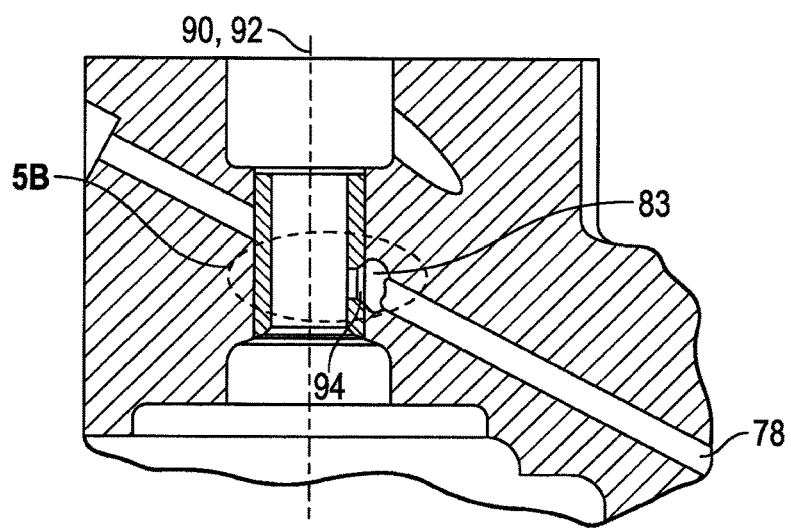
FIG. 5A is a schematic of the sleeve of FIG. 4 inserted into the machined bore.

FIG. 5A shows the sleeve inserted into the bore. The radiused aperture communicates with the fuel passage 78 and the seat 98 cooperates with the poppet valve. The refurbished injector body is then able to have an indefinite life as it may be serviced with a replacement sleeve whenever the poppet valve seat surface becomes excessively worn.

Figure 5B:
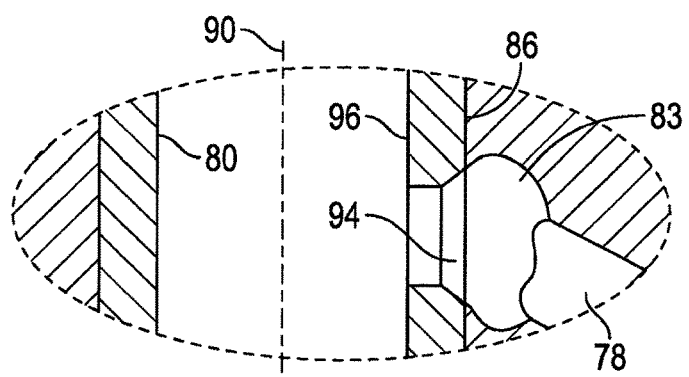
FIG. 5B is a detail of FIG. 5A showing the inter action between the radiused sleeve aperture and the radiused portion of the machined fuel passage.

FIG. 5B is a detail of the interaction between the radiused insert sleeve aperture 94 and the radiused fuel passage portion 83. Specifically, the insert sleeve is oriented in the machined poppet valve bore such that the radiused aperture 94 is in direct communication with the radiused portion 83 of the fuel passage 78. The radiused portion 83 of the fuel passage 78 was previously described in reference to FIGS. 3A and 3B. When sleeve 86 is inserted into the machined poppet valve bore it is oriented in the machined bore such that radiused aperture 94 is in mating communication with radiused portion 83 of the fuel passage 78. It has been found that radiusing both the fuel sleeve aperture and the passage portion 82 directly adjacent the machined poppet valve bore 46 to control failures arising from fuel flow through the stress riser of the remachined fuel injector.

The words used in the description of the invention are words of description and not words of limitation. Those skilled in the art recognize many variations are possible without departing from the scope and spirit of the invention as set forth in the offered claims.

What is claimed as new and desired to be protected by Letters Patent of the United States is:

1. A method for refurbishing a fuel injector; said fuel injector having a body, a solenoid controlled poppet valve located in a valve bore guide in said body adapted to cooperatively engage a valve seat surface in said body; said bore intersecting a fuel passage at an angle to form a stress riser said method comprising:
    removing said poppet valve from said valve bore guide;
    machining said bore and valve seat to remove cavitation;
    machining said fuel passage to increase a radius of the fuel passage with an undercut at said stress riser;
    radiusing the fuel passage at said stress riser and undercut with abrasive flow technology;
    nitriding said valve bore guide and radiused fuel passage to a sufficient depth to restore hardness thereto; and
    inserting a poppet valve guide seat sleeve into said valve bore guide of a sufficient height to act as a valve seat.

2. The method of claim 1, wherein creating an undercut and radiusing with abrasive flow technology creates a controlled radius of from about 0.7 mm to about 1.0 mm.

* * * * *